(12) United States Patent
Musaefendic

(10) Patent No.: US 8,956,711 B2
(45) Date of Patent: Feb. 17, 2015

(54) HIGH IMPACT STRENGTH, ELASTIC, COMPOSITE, FIBRE, METAL LAMINATE

(76) Inventor: Jasko Musaefendic, Grovedale (AU)

( * ) Notice: Subject to any disclaimer, the term of this patent is extended or adjusted under 35 U.S.C. 154(b) by 415 days.

(21) Appl. No.: 10/596,847

(22) PCT Filed: Jul. 29, 2004

(86) PCT No.: PCT/AU2004/001004
§ 371 (c)(1),
(2), (4) Date: Jun. 27, 2006

(87) PCT Pub. No.: WO2005/068176
PCT Pub. Date: Jul. 28, 2005

(65) Prior Publication Data
US 2007/0148486 A1 Jun. 28, 2007

(30) Foreign Application Priority Data
Jan. 19, 2004 (AU) .................. 2004900201

(51) Int. Cl.
*F41H 5/02* (2006.01)
*F41H 5/00* (2006.01)
(Continued)

(52) U.S. Cl.
CPC .............. *B62D 29/001* (2013.01); *B32B 15/08* (2013.01); *F41H 5/0457* (2013.01); *B62D 29/004* (2013.01)
USPC ........... 428/136; 428/131; 428/132; 428/133; 428/134; 428/137; 89/36.01; 89/36.02; 89/36.05

(58) Field of Classification Search
USPC .............. 156/242, 307.5, 196, 229, 289, 292, 156/293, 303.1, 307.1, 307.3, 307.7, 331.2, 156/335, 60, 62.6, 910; 264/50, 349; 277/651, 654, 916, 922; 427/394, 244, 427/289, 336, 366, 375, 389.9, 393.5, 427/407.3, 412; 428/198, 328, 544, 91, 428/219, 220, 304.4, 317.1, 317.7, 343, 428/355 R, 378, 382, 383, 392, 394, 409, 428/423.3, 428, 441, 494, 495, 506, 521, 428/904, 92, 97, 116–120, 174–184; 442/134, 149, 328, 394, 407, 59, 63, 442/97, 104, 105, 164, 180, 183, 184, 189, 442/286, 315, 327, 329, 340, 345, 347, 351, 442/163, 381, 382, 389, 384, 400, 401, 415, 442/62, 77; 451/533, 526; 524/401, 510; 525/135, 191; 526/265, 340; 556/10, 556/63; 52/635, 670
See application file for complete search history.

(56) References Cited

U.S. PATENT DOCUMENTS 2,733,177 A * 1/1956 Meyer .............................. 428/49
2,768,919 A * 10/1956 Bjorksten et al. ................ 428/51
(Continued)

FOREIGN PATENT DOCUMENTS

DE 10153165 A1 5/2003

OTHER PUBLICATIONS

Avallone, E.A.; Baumeister, T., III (1996). Marks' Standard Handbook for Mechanical Engineers (10th Edition). (Tables 6.1.5 & 6.12.1). McGraw-Hill. Online version available at: http://www.knovel.com/knovel2/Toc.jsp?BookID=346&VerticalID=0.*
(Continued)

*Primary Examiner* — Jennifer A Steele
(74) *Attorney, Agent, or Firm* — David A. Guerra

(57) ABSTRACT

A damage resistant High Strength, Impact Resistant, Elastic Composite Laminate primary (singular) structure with optionally having first (4) and second (4) outer face layers, having first (2) and second (2) inner reinforced plies being located between the first and second outer layers, and (1) a dissipating element located between the first and second reinforced plies, wherein the dissipating element is adapted to dissipate and redirect, randomly directed active loading applied to at least one of the two outer surface, to tensile loading being directed along the respective longitudinal axis of the inner reinforced ply; and a matrix (3) between (2) and (4).

15 Claims, 4 Drawing Sheets

(51) Int. Cl.
*F41H 5/24* (2006.01)
*F41H 5/08* (2006.01)
*B32B 3/10* (2006.01)
*B62D 29/00* (2006.01)
*B32B 15/08* (2006.01)
*F41H 5/04* (2006.01)

(56) References Cited

U.S. PATENT DOCUMENTS

| | | | | |
|---|---|---|---|---|
| 3,755,059 | A | * | 8/1973 | Calfee .................... 428/182 |
| 3,930,095 | A | * | 12/1975 | van Gils et al. ............. 442/149 |
| 3,969,563 | A | * | 7/1976 | Hollis, Sr. .................... 428/175 |
| 3,974,320 | A | * | 8/1976 | Gerlach et al. ................. 442/63 |
| 3,989,789 | A | * | 11/1976 | Brookhart .................... 264/136 |
| 4,179,979 | A | * | 12/1979 | Cook et al. .................. 89/36.02 |
| 4,358,498 | A | * | 11/1982 | Chavannes .................... 428/108 |
| 4,761,324 | A | * | 8/1988 | Rautenberg et al. .......... 428/198 |
| 5,447,594 | A | * | 9/1995 | Josefsson .................. 156/307.5 |
| 5,903,920 | A | | 5/1999 | Granqvist |
| 5,952,252 | A | * | 9/1999 | Shawver et al. ............. 442/407 |
| 6,063,716 | A | | 5/2000 | Granqvist |
| 6,207,237 | B1 | * | 3/2001 | Haffner ........................ 427/394 |
| 6,703,104 | B1 | * | 3/2004 | Neal ............................. 428/118 |
| 7,015,155 | B2 | * | 3/2006 | Zhou et al. .................... 442/149 |
| 7,153,789 | B1 | * | 12/2006 | Hatjasalo et al. ............. 442/134 |
| 2003/0180517 | A1 | | 9/2003 | Karall |
| 2004/0005834 | A1 | * | 1/2004 | Zhou et al. .................... 442/328 |
| 2004/0038022 | A1 | * | 2/2004 | Maugans et al. ............. 428/328 |
| 2004/0112524 | A1 | * | 6/2004 | Erdos et al. .................. 156/290 |
| 2007/0029690 | A1 | * | 2/2007 | Green et al. .................... 264/50 |
| 2007/0141930 | A1 | * | 6/2007 | Thomas et al. ................. 442/59 |

OTHER PUBLICATIONS

Brydson, J. (1999). Plastics Materials (7th Edition). (pp. 442-448). Elsevier. Online version available at: http://www.knovel.com/knovel2/Toc.jsp?BookID=440&VerticalID=0.*

Shigley, J.E.; Mischke, C.R. (1996). Standard Handbook of Machine Design (2nd Edition). (pp. 25.12-25.17). McGraw-Hill. Online version available at: http://www.knovel.com/knovel2/Toc.jsp?BookID=733&VerticalID=0.*

Stankey Expanded Mesh, downloaded from internet Jun. 3, 2013.*

Hagenbeek M. et al., Static Properties of Fibre Metal Laminates, Applied Composite Materials, vol. 10, No. 4-5, pp. 207-222, Jul. 2003. ISSN 0929-189X.

* cited by examiner

HIGH IMPACT STRENGTH, ELASTIC, COMPOSITE, FIBRE, METAL LAMINATE

CROSS-REFERENCE TO RELATED APPLICATIONS

This application is an U.S. national phase application under 35 U.S.C. §371 based upon co-pending International Application No. PCT/AU2004/001004 filed on Jul. 29, 2004. Additionally, this U.S. national phase application claims the benefit of priority of co-pending International Application No. PCT/AU2004/001004 filed on Jul. 29, 2004 and Australian Application No. 2004900201 filed on Jan. 19, 2004. The entire disclosures of the prior applications are incorporated herein by reference. The international application was published on Jul. 28, 2005 under Publication No. WO 2005/068176 A1.

FIELD OF THE INVENTION

The present invention relates to high impact resistant composite laminate structures.

BACKGROUND OF THE INVENTION

It is known to utilise physical characteristics of fibre composites to enhance impact resistant properties of, for example, a laminate structure. However, the elastic properties of continuous and unidirectional fibrous composites are highly anosotropic and depend of fibre orientation with respect to the applied stress. The axial tensile strength of a unidirectional lamina is typically controlled by the fibre ultimate strain. The transversal tensile strength of a unidirectional lamina is mainly controlled by the matrix ultimate strain. The strength of a fibre reinforced structure is a least an order of magnitude greater in the longitudinal direction than in the transversal/perpendicular direction to the fibre axis.

OBJECT OF THE INVENTION

The present invention seeks to provide a new laminate which utilises a composite structure.

SUMMARY OF THE INVENTION

In accordance with the invention, there is provided a high-strength, impact resistant, elastic, fibre composite laminate including at least two outer layers, two inner fibre plies between the said outer layers and at least one dissipating element between the inner plies, wherein said at least one dissipating element dissipates and redirects a load applied to the laminate to tensile loading of at least one of said inner plies directed along its longitudinal axis.

In another aspect, there is provided a nanostructure including at least two inner fibre plies and at least one dissipating element between the inner plies, wherein said at least one dissipating element dissipates and redirects a load applied to the laminate to tensile loading of at least one of said inner plies directed along its longitudinal axis.

The laminate includes a pair of outer layers and a polymer matrix between each of the plies and the outer layers.

In comparison with known structural materials the laminate offers a unique combination of mechanical strength, especially during extreme dynamic loading (impact), with significant weight reduction in comparison with similar samples made from steel or aluminium.

BRIEF DESCRIPTION OF THE DRAWINGS

The invention is described by way of non-limiting example only, with reference to the drawings, in which.

DETAILED DESCRIPTION OF A PREFERRED EMBODIMENT

Figure 1:
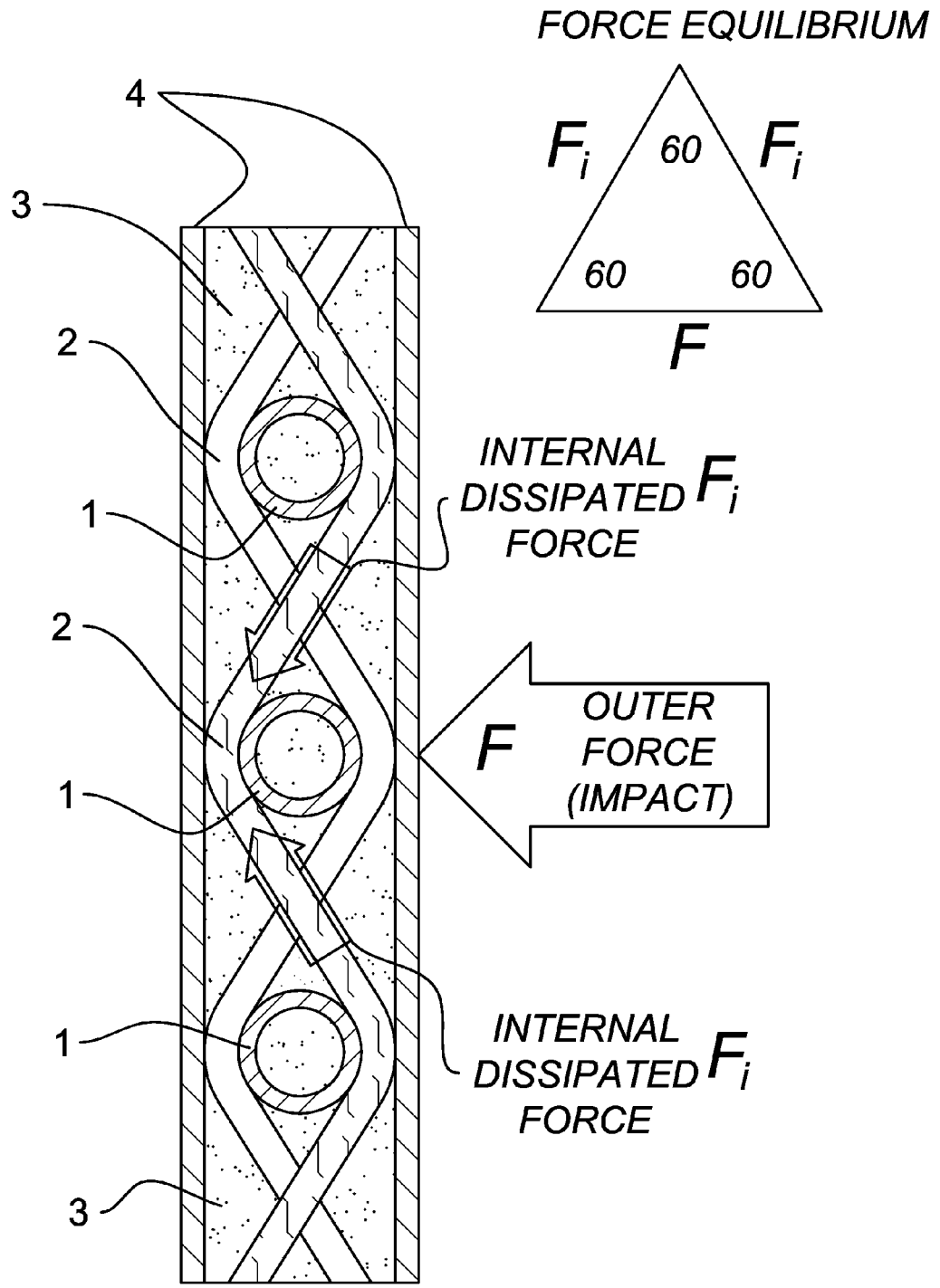
FIG. 1 is a fragmentary cross-sectional view of a laminate with tubes as dissipating elements.

A laminate structure formed in accordance with the invention represents a new approach in damage tolerant material design philosophy with first and second outer face layer for forming an outer face (4), at least two inner plies (2), a dissipating element (1) and polymer matrix (3).

The dissipating elements may be various metal, non-metal, natural and non-natural structures in a form of, but not limited to: expanded metal, ORNAMESH®, rigidised metal, corrugated sheet, tubular shape, spherical shape, other geometric shapes, ribbed, textured, woven mesh (plain, twill square, holander, micron), and any other similar geometric forms, or other structures having the function of dissipation and redirection of local active outer loading (perpendicular/transversal or impact) applied to at least one of the faces, to tensile loading, of at least one of said inner reinforced plies directed along its longitudinal axis. ORNAMESH® is known to one skilled in the art as being an expanded metal mesh formed with diamond openings defined by angularly displaced sections of a metal sheet.

The inner plies (2) are constructed from a variety of dry or pre-impregnated (prepregs) reinforcement materials such as but not limited to: Glass, Aramid, Carbon, Quartz, Boron, Basalt, Polyurethane, natural, non-natural, and any other single or hybrid fibres, in combination with variety of any known thermosetting and thermoplastic matrixes (3) such, but not limited to: Vinylester, Epoxy, Phenolic, polypropylene, Nylon, Polyester, Amino, Bismaleimides, Polyether, Silicones, Cyanetesters, Polybutadhine, Polytheramide, Polyimides, fire retardant, corrosion resistant, any sort of adhesives, coatings, pigments, sealants, catalysts, accelerators, diluents, etc.

The outer face layers (4) may be made from a variety of any metallic, non-metallic natural or non-natural materials.

The above described laminate structure represents a singular variation of material creation, and there is possibility to apply plurality of plies as described above in any possible direction and combination.

FIG. 1 illustrates basic principles of internal force-impact energy dissipation and redirection of local active loading (impact) [F] applied to at least one of the two outer faces of the new structure, to longitudinal (tensile) reaction [Fi] in fibre reinforcement plies in a single structure. These forces are forming force equilibrium as shown on FIG. 1 show an example of the laminate structure (7) where the Aluminium tubes (1) are used as dissipating elements. The inner plies (2) are substantially sinusoidal in cross-section with an apex of one of the inner plies being adjacent to one of the first and second outer layers (4). In the alternative, at least one apex of one of the inner plies (2) is adjacent to the first outer layer (4), and at least one apex of another of the inner plies (2) is adjacent the second outer layer (4).

Figure 2:
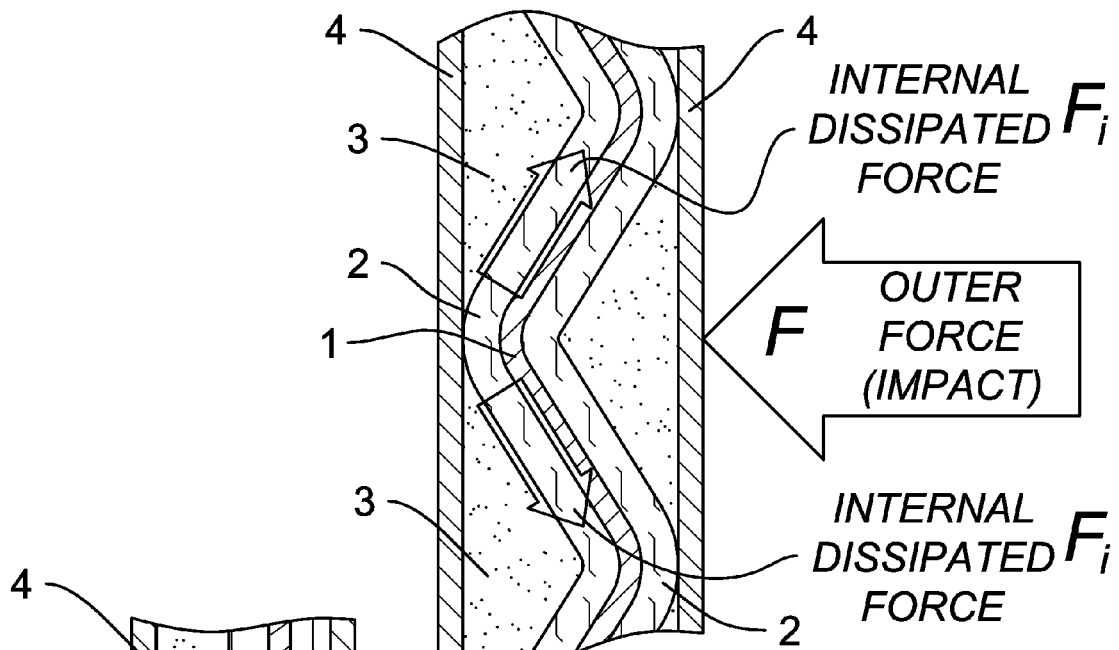
FIG. 2 is a fragmentary cross-sectional view of a laminate with corrugated sheet as dissipating elements.
Figure 3:
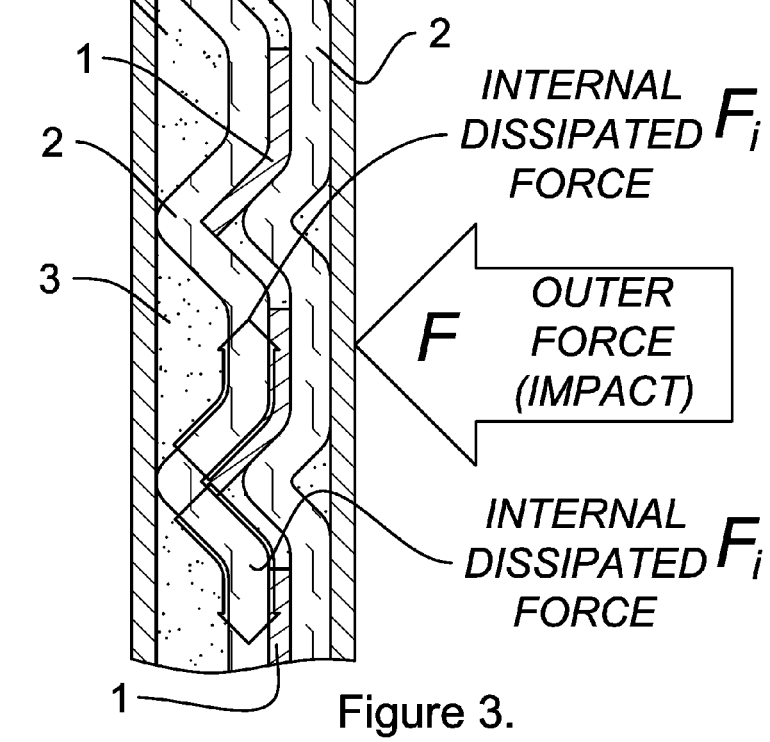
FIG. 3 is a fragmentary cross-sectional view of a laminate with ORNAMESH®/rigidized form as dissipating elements.
Figure 3A:
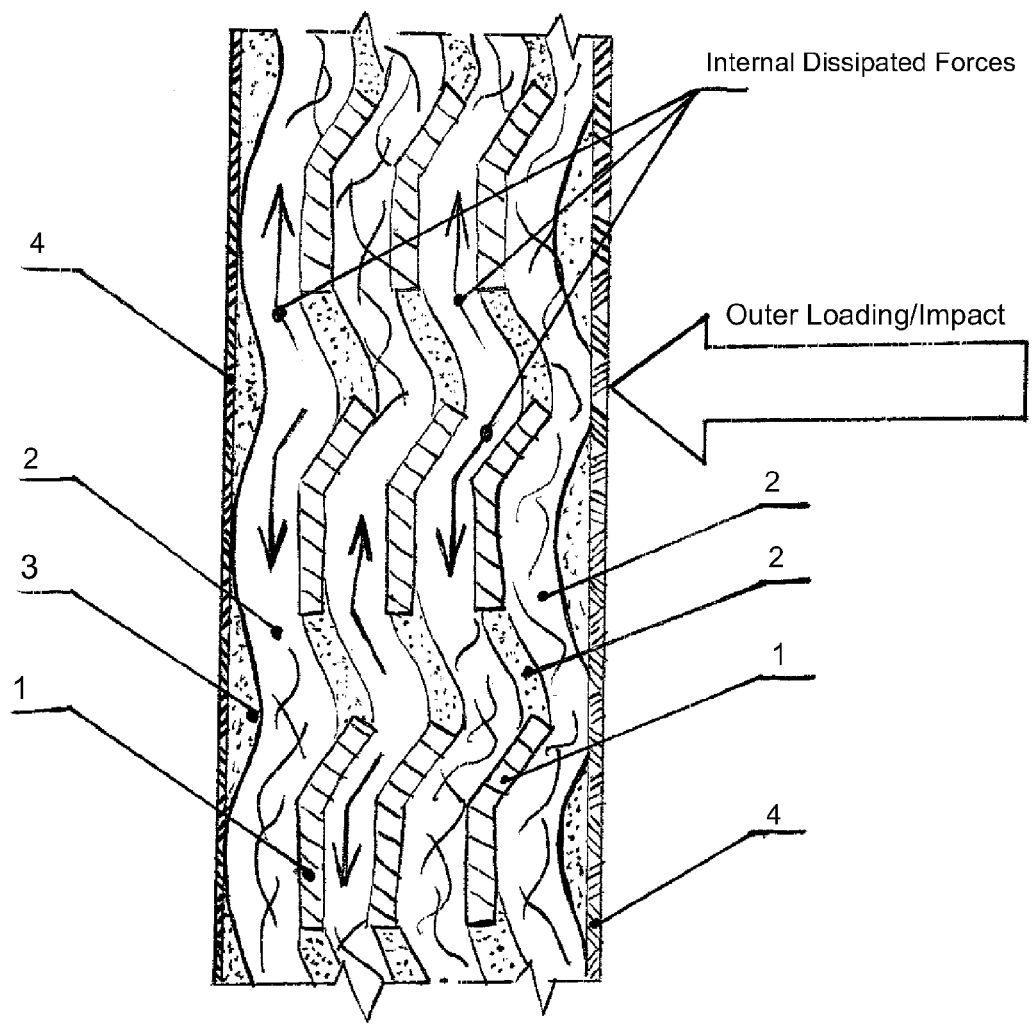

FIGS. 2 and 3 show another two examples (single structure) where applied various metal structures (expanded metal, ORNAMESH®, rigidised forms, corrugated sheets), as the dissipated elements (1), can redirect outer active force/impact energy [F] to the face of the structure, to the tensile force/reaction [Fi] in the longitudinal axis of reinforcement plies (2).

FIG. 3 show very high consistency of impact energy absorbed by Strength, Impact Resistant, Elastic Composite Laminate samples.

Figure 4:
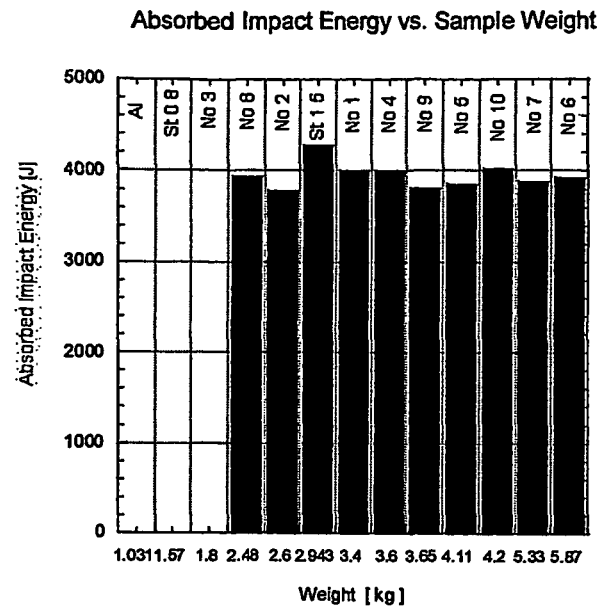
FIG. 4 is a graph showing the relationship between samples weight and respective impact energy absorbed.
Figure 5:
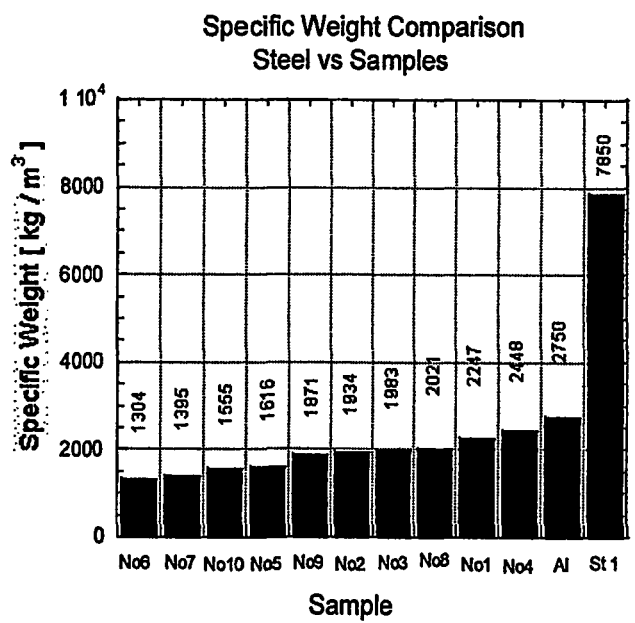
FIG. 5 is a graph showing weight comparison between samples.

FIG. 4 show significant specific weight reduction of Novel High Strength, Impact Resistant, Elastic Composite Laminate materials in comparison with steel and aluminium.

To further expand on the above, to achieve internal active force/impact energy dissipation and redirection in the laminate (FIG. 1) various metallic and non-metallic structures may be used as dissipating elements including but not limited to: expanded metal, ORNAMESH®, rigidised forms, corrugated sheets, tubular shapes, spherical shapes, weave mesh (plain, twill, square, Hollander, micron) metallic or non-metallic foams, foam like structures and any other similar forms (2), and include but are not limited to one or more elements selected from the following metallic, non-metallic, natural and non-natural material groups including but not limited to: aluminium alloys, steel alloys, zinc alloys, titanium alloys, copper alloys, magnesium alloys, nickel alloys, brass alloys, carpenter, gold, silver, platinum, hastelloy, haynes alloy, inconel, molybden alloy, palladium, bronze, tantalum, monel, tungsten, borron, beryllium, zintec, matrix composites, thermoplastics, thermosets, plastics, foams, wood, rubber, paper, ceramics, leather, balsa, cedar, liquids and gases (vacuum) as a single components or compositions.

As a result of loading redirection/dissipation, there are now tensile-reactive forces/loadings in at least one of reinforcement plies directed along its longitudinal axes and, based on mechanical properties of fibre reinforcement materials where the tensile strength of reinforcement materials is at least an order of magnitude higher than transversal strength, the result is the significantly higher strength, especially impact resistant, novel laminate structure. [MC1] In comparison with already known/existing composite structures whose major disadvantage is brittleness, the laminate can offer high impact resistance with exceptionally high levels of elastic/plastic deformability and high percentage of elastic recovery after plastic deformation.

With application of this invention, the impact resistance of the laminate does not depend mainly on the matrix's (3) properties; it is now mainly dependable on the fibre reinforcement's mechanical properties.

Specific, desirable properties of new composite structures include:
redirection and dissipation of outer transversal/perpendicular loading/impact to tensile loading along longitudinal axis in reinforcement inner plies,
high impact strength,
high energy-absorbing ability,
high elastic/plastic deformability under impact,
high percentage of elastic recovery during plastic deformation,
low density,
high tensile strength in all directions,
high fatigue resistance and durability,
simple and cost-effective machining and fabricating.

Production of a suitable laminate can include all known processes in composite manufacturing such as, but not limited to: hand lay-up, wet lay-up, spray-up, bag moulding, pressure/vacuum bag moulding, match moulding, press moulding, infusion, open moulding, closed moulding, sequentical moulding, continuous moulding, resin transfer moulding, autoclave moulding.

The laminate structure is made from cost-effective and standard materials readily available and exhibits significant proven improved mechanical properties in comparison with all existing composite laminates.

With respect to orientation, these internal dissipating elements may be arranged as, but not limited to, unidirectional, cross-ply, symmetric, balanced and quasi-isotropic.

As components in the manufacturing of a diverse variety of laminates it is possible to use any known single or hybrid dry or preimpregnated (prepregs) reinforcement fibres that are made from one or more materials selected from the groups consisting of, but not limited to: Glass (E, S, S-2, T, E-CR), Aramid, Carbon/Graphite, Quartz, Ceramic, PBO, Basalt, Boron, Polyethylene, Natural and hybrid fibre reinforcements (2) as, but not limited to: Quadriaxial, Unidirectional, Double-bias, Biaxial, Triaxial, Plain woven, Woven rovings, Braided, Yarn, 3 Weave rovings, Chopped strands, Mats, simultaneous stitches with use of any known matrixes (3) but not limited to: Vinylester, Epoxy, Phenolic, Polypropylene Nylon, Polyester, Amino, Bismaleimides, Polyether, Silicones, Cyanatesters, Polybutadhine, Polyetheramide, Polyimides, fire retardant, corrosion resistant, any sort of adhesives, coatings, pigments, sealants, catalysts, accelerators, diluents, etc.

With respect to orientation, reinforcement plies may be arranged in a number of ways, including: unidirectional, cross-ply, symmetric, balanced, quasi-isotropic and hybrid laminates.

Outer face layers (4), whether for protective or decorative purpose, may be one of the metallic, non-metallic, natural and non-natural materials including, but not limited to: aluminium alloys, steel alloys, zinc alloys, titanium alloys, copper alloys, magnesium alloys, nickel alloys, brass alloys, carpenter, gold, silver, platinum, hastelloy, hayness alloy, inconel, molibden alloy, palladium, bronze, tantalum, monel, tungsten, boron, beryllium, zintec, matrix composites, thermoplastics, thermosets, plastics, foams, wood, rubber, paper, ceramics, leather, balsa, cedar.

The laminate as their integral components may include structures based on a variety of metallic, non-metallic, natural and non-natural materials such as, but not limited to: aluminium alloys, steel alloys, zinc alloys, titanium alloys, copper alloys, magnesium alloys, nickel alloys, brass alloys, carpenter, gold, silver, platinum, hastelloy, haynes alloy, inconel, molybden alloy, palladium, bronze, tantalum, monel, tungsten, borron, beryllium, zintec, matrix composites, thermoplastics, thermosets, plastics, foams, wood, rubber, paper, ceramics, leather, balsa, cedar, liquids and gases (vacuum) as a single components or compositions.

Nanostructures may be formed as described above, with substitution of expensive materials such as boron, with materials mentioned, to reduce current high prices and make them widely available to industry, but they are not limited only to these components.

As the second stage of fabricating parts/structures with the laminates, it is possible to use most of technologies used in metal and plastics forming processes such as, but not limited to: moulding and stamping, as well as technologies used in cold deformation forming processes such as, but not limited to: blanking, punching, flanging, embossing, bending and drawing.

Primary and secondary structures designed, created and manufactured on the basis of the laminate material design philosophy, can be used in the:
- aviation industry (civil and military),
- space industry (civil and military),
- train and rail industry (civil and military),
- maritime industry (civil and military),
- automotive industry (civil and military),
- all sorts of building industry (civil and military),
- protective industry/ballistic (civil and military),
- construction industry, decoration, machinery, furniture and municipal engineering, road-side safety barriers, and similar,
- multiple general applications,
- materials developed through nanotechnology.

EXAMPLES

For example, measured and calculated average properties of laminate sample made from two outer layers of E-Glass quadriaxial woven fibre 1200 gr/m2, one internal/dissipation element: Aluminium ORNAMESH® Type R, and Vinylester resin DERAKANE 411-350, are:
Tensile Strength σ>1000 MPa,
Density ρ=2247 kg/m3,
Peak Impact Force F=184.3 kN (without penetration),
Impact Energy Absorbed EA=3985 J (without penetration),
Deflection 41 mm,
Young's modulus of elasticity E=33 GPa,
Poison's ratio ν=0.33.
Density of some High Strength, Impact Resistant, Elastic Composite Laminate design solutions may be significantly reduced to 1600 kg/m3.

impact energy absorbed by the Steel sample with 40% lower deflection. At the same time, the weight reduction between NHSIRECL 1 and Steel 1.5 mm is more than 100%.

In comparison with Steel 1.5 mm sample, NHSIRECL 2 shows high level of plastic/elastic deformation, superior deflection reduction with significant weight reduction. Deflection of NHSIRECL 2 is only 20% of deflection recorded by the Steel sample, with 88% of impact energy absorbed of these absorbed by the Steel sample.

Use of the laminates of the invention delivers highly controlled and predictable behaviour under load, accompanied by:
- manufacturing costs can be significantly minimized since known and established manufacturing processes are used;
- manufacturing time can be significantly minimized since known and established manufacturing processes are used and manufacturing simplicity;
- materials costs can be significantly minimized since already available, cost-effective materials are used,
- materials costs can be significantly minimized since reduced number of applied reinforcement plies
- significant finished-product weight reduction;
- demonstrated increases in mechanical properties through its substitution for heavier (steel and aluminium) and more expensive metals;
- expected improved fatigue resistance;
- low maintenance and repair costs;
- the possibility of innovative cost-saving solutions to design problems now limited by the necessity to use conventional heavier metal sheeting;
- the possibility to manufacture complex sections with reduced number of primary parts in an assembly.

TABLE 1

Comparison of selected mechanical properties of materials now in use in the automotive and aviation industries with some of the laminates of the invention.

| Materials | Thickness [mm] | Specific Weight [kg/m3] | Weight per 1 m2 [kg/m2] | Absorbed Impact Energy [J] | Specific Absorbed Impact Energy/Weight [J/kg] | Deformation [mm] | Peak Force [kN] | Tensile Strength [MPa] |
|---|---|---|---|---|---|---|---|---|
| Aluminium | 1.5 | 2750 | 4.13 | 0 | 0 | perforated | — | 485 |
| Steel | 0.8 | 7850 | 6.28 | 0 | 0 | perforated | — | 655 |
| Steel | 1.5 | 7850 | 11.78 | 4272 | 1453 | 69 | 133.4 | 655 |
| Honey. Comp. | 4.3 | 1220 | 5.25 | — | — | perforated | — | — |
| Glare-5 | 2.0 | 2590 | 5.18 | 150 | — | perforated | 10.3 | — |
| NHSIRECL 1 | 2.9 | 2247 | 6.51 | 3985 | 1510 | 41 | 184.3 | >1000 |
| NHSIRECL 2 | 5.0 | 1934 | 9.67 | 3778 | 1108 | 13 | 153.9 | >1000 |
| NHSIRECL 6 | 15.2 | 1304 | 19.82 | 3919 | 688 | 29 | 176.0 | >1000 |
| DYN 1 | — | — | — | 3727 | — | perforated | 91.7 | — |
| DYN 5 | — | — | — | 4100 | — | perforated | 69.9 | — |

Legend:
Data for Glare-5, "Application of Fibre-Metal Laminates", Polymer Composites, August 2000, [Absorbed Impact Energy (maximum) before Perforation],
Data for DYN 1, and DYN 5 (Structures based on Kevlar reinforcements), form "Impact Testing in Formula One", A. N. Mellor, (Absorbed Impact Energy within displacement of 100 mm) Transport Research Laboratory, Crowthorne, England, ("ICRASH 2002" International Conference, February 2002, Melbourne),
NHSIRECL - Composite Laminates of the invention.

Samples (Aluminium, Steel and NHSIRECL) were rigorously tested on a controlled drop weight impact tower with an impactor made from solid steel, weighing 45 kg. The impactor head was formed as sphere of diameter 200 mm. Sample dimensions were 500×500 mm. The speed of the impactor at the moment of impact was 55 km/h.

The comparison between Steel sample thickness 1.5 mm and sample NHSIRECL 1 (Table 1), shows that the level of impact energy absorbed by NHSIRECL 1 is 93% of the The desirable properties of the laminates (high strength, high impact resistance, elasticity/plasticity) give their user a unique opportunity to create structures exhibiting easily replicated, tightly controlled behaviour under a wide range of loads, especially under extreme impact loading.

The physical properties of the laminates could be widely varied and precisely tailored to the needs of the particular end use application by combining various sorts of materials in large number of permutations for creating new structures.

The result of all above mentioned is an opportunity of global implications for the application and further development of high-tech, high-impact strength, elastic/plastic, cost-effective, lightweight products and components for everyday use in manufacturing, transport, packaging and variety of civil and military industry in general.

Although particular preferred embodiments of the invention have been disclosed in detail for illustrative purposes, it will be recognised that variations of permutations and modifications of the disclosed invention, including the use of various materials/components in creating the laminate lie within the scope of the present invention.

What is claimed is:

1. A high impact strength, elastic laminate system for enhancing impact resistant properties of a laminate structure, said laminate system comprising:
   a first outer layer;
   a second outer layer;
   at least two inner plies placed between the first and second outer layers, said inner plies are substantially sinusoidal in cross-section and having at least one apex, and at least one planar trough section;
   at least one dissipating element between said inner plies and juxtaposed to said inner plies, said dissipating element being configured to dissipate and redirect randomly directed local loading applied to at least one of said two outer layers, to tensile loading directed in longitudinal direction (tensile) of said inner plies, said dissipating element is an expanded metal mesh having a sheet featuring a plurality of planar sections, and a plurality of openings each being defined by an angularly displaced portion of said sheet; and
   a polymer matrix in between said first and second outer layers, and said first and second inner plies; said polymer matrix arranged to occupy all the volume not taken up by, and in between the said two outer layers, said at least two inner plies, and said at least one dissipating element;
   wherein said apex of a first of said inner plies being adjacent to and contacting said first outer layer, and said apex of a second of said inner plies being received in one of said openings of said dissipating elements;
   wherein each of said planar trough sections of said first of said inner plies contacting at least one of said planar sections of said dissipating element, and each of said planar trough sections of said second of said inner plies contacting said second outer layer.

2. The high impact strength, elastic laminate system as set forth in claim 1, wherein additional layers of said first and second plies, said dissipating element, and said polymer matrix are placed between said first and second outer layers.

3. The high impact strength, elastic laminate system as set forth in claim 1, wherein said inner plies are reinforcement plies.

4. The high impact strength, elastic laminate system as set forth in claim 1, wherein said reinforcement plies are made from a material selected from the group consisting of E-glass, R-glass, S2-glass, aramids, carbon, single fibre reinforcement, hybrid fibre reinforcement (natural or non-natural), Quadriaxial, Unidirectional, Double-bias, Biaxial, Triaxial, Plain woven, Basalt, and Woven rovings.

5. The high impact strength, elastic laminate system as set forth in claim 1, wherein said dissipating element is made from a material selected from the group consisting of aluminum alloys, steel alloys, zinc alloys, titanium alloys, copper alloys, magnesium alloys, nickel alloys, aluminum alloy matrix composites, thermoplastics, plastics, polymers, foams, and wood.

6. The high impact strength, elastic laminate system as set forth in claim 5, wherein said dissipating ply element comprises of at least two dissipating ply elements, said dissipating ply elements and said reinforcement plies are each arranged in an arrangement selected from the group consisting of unidirectional, cross-ply, symmetric, balanced, quasi-isotropic, and hybrid laminates.

7. The high impact strength, elastic laminate system as set forth in claim 6, wherein said polymer matrix is made from a matrix selected from the group consisting of Vinylester, Epoxy, Phenolic, fire retardant, and adhesive.

8. The high impact strength, elastic laminate system as set forth in claim 7, wherein said first and second outer layers are made from a material selected from the group consisting of aluminum alloys, steel alloys, zinc alloys, titanium alloys, copper alloys, magnesium alloys, nickel alloys, alloy matrix composites, wood, plastics, paper, thermoplastics, polymers, foams, and paints.

9. The high impact strength, elastic laminate system as set forth in claim 8, further comprising at least one additional layer placed on any one of said outer layers, said additional layer being made from a material selected from the group consisting of foams, wood, honeycomb structures, thermoplastics, plastics, polymers, hybrid sandwiches, and paper.

10. The high impact strength, elastic laminate system as set forth in claim 9 wherein said dissipating elements being adapted to create an equilibrium of dissipated loads in said laminate structure with a component of the outer loading being redistributed in a longitudinal direction to the main axis of said reinforcement plies.

11. The high impact strength, elastic laminate system as set forth in claim 10, wherein said laminate system is adapted to absorb impact energy from about 3770 to about 4000 J, and absorb and redirect forces from about 50 to about 190 kN.

12. The high impact strength, elastic laminate system as set forth in claim 11, wherein said laminate system has a density range from about 1300 to about 2250 kg/m$^3$.

13. The high impact strength, elastic laminate system as set forth in claim 1, wherein said planar trough sections of said second of said inner plies is contacting said planar sections of said dissipating element respectively.

14. The high impact strength, elastic laminate system as set forth in claim 1, wherein a free end of said angularly displaced portion of said expanded metal mesh is adjacent an interior of said apex of said first of said inner plies.

15. The high impact strength, elastic laminate system as set forth in claim 1, wherein said second of said inner plies has at least one substantially planar surface adjacent said apex, said planar surface is in contact with said angularly displaced portion of said expanded metal mesh.

* * * * *